(12) United States Patent
Huynh et al.

(10) Patent No.: US 6,684,632 B2
(45) Date of Patent: Feb. 3, 2004

(54) ARRANGEMENT AND METHOD FOR IGNITING A COMBUSTIBLE GAS MIXTURE FOR THE EXHAUST SYSTEM OF AN INTERNAL-COMBUSTION ENGINE AND CORRESPONDING EXHAUST SYSTEM

(75) Inventors: Ngoc-Hoa Huynh, Leonberg (DE); Lorenz Salzer, Rutesheim (DE); Peter Gerl, Esslingen (DE)

(73) Assignees: Dr. Ing. h.c.F. Porsche AG, Stuttgart (DE); Audi AG, Ingolstadt (DE); Bayerische Motoren Werke AG, Munich (DE); DaimlerChrysler AG, Stuttgart (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 09/925,042

(22) Filed: Aug. 9, 2001

(65) Prior Publication Data
US 2002/0023434 A1 Feb. 28, 2002

(30) Foreign Application Priority Data
Aug. 9, 2000 (DE) .......................................... 100 38 743

(51) Int. Cl.⁷ ................................................. F01N 3/10
(52) U.S. Cl. ........................................... 60/303; 60/300
(58) Field of Search ......................... 60/284, 300, 303, 60/286, 299

(56) References Cited

U.S. PATENT DOCUMENTS

| | | | | |
|---|---|---|---|---|
| 3,812,324 A | * | 5/1974 | Faffaelli et al. ........... 236/46 C |
| 3,838,569 A | * | 10/1974 | Reck ........................... 219/270 |
| 4,505,107 A | * | 3/1985 | Yamaguchi et al. .... 123/145 A |
| RE31,908 E | * | 6/1985 | Petrik et al. ................ 219/270 |
| 5,342,591 A | | 8/1994 | Pfefferle | |
| 5,380,506 A | * | 1/1995 | Taylor, Jr. .................... 60/302 |
| 5,419,123 A | * | 5/1995 | Masters ...................... 422/171 |
| 5,685,144 A | * | 11/1997 | Ma .............................. 60/274 |
| 5,720,609 A | | 2/1998 | Pfefferle | |
| 5,791,308 A | * | 8/1998 | Carter et al. ............ 123/145 A |
| 6,023,929 A | * | 2/2000 | Ma .............................. 60/295 |

FOREIGN PATENT DOCUMENTS

| | | |
|---|---|---|
| GB | 2 134 407 A | 8/1984 |
| GB | 2 280 128 A | 1/1995 |
| JP | 58-065925 | * 4/1983 |
| JP | 58-124012 | * 7/1983 |

OTHER PUBLICATIONS

European Search Report dated May 26, 2003.

* cited by examiner

Primary Examiner—Thomas Denion
Assistant Examiner—Diem T Tran
(74) Attorney, Agent, or Firm—Crowell & Moring LLP

(57) ABSTRACT

An arrangement for igniting a combustible gas mixture for the exhaust system of an internal-combustion engine has a frame device which is wound with a heating wire and can be installed into an exhaust gas train of the exhaust system transversely to the flow axis of the exhaust gas. A power supply device is provided for supplying the heating wire with electric current for generating a predetermined heating wire temperature. The frame device defines a flow range in which a heating wire grid is provided.

23 Claims, 2 Drawing Sheets

ARRANGEMENT AND METHOD FOR IGNITING A COMBUSTIBLE GAS MIXTURE FOR THE EXHAUST SYSTEM OF AN INTERNAL-COMBUSTION ENGINE AND CORRESPONDING EXHAUST SYSTEM

BACKGROUND AND SUMMARY OF THE INVENTION

This application claims the priority of German Patent Document 100 38 743.8, filed Aug. 9, 2000, the disclosure of which is expressly incorporated by reference herein.

The present invention relates to an arrangement for igniting a combustible gas mixture for the exhaust system of an internal-combustion engine and to a corresponding exhaust system.

When aftertreating the exhaust gas of an internal-combustion engine of a motor vehicle, the reduction of pollutants in the exhaust gas during the cold start and the warm-up of the internal-combustion engine has priority as the most promising potential for reducing pollutants. Among others, methods are known for this purpose in which, during the cold start, a combustible air/fuel mixture is generated in the exhaust gas train and the heating value contained in the exhaust gas is utilized for the rapid heating of the pollutant-converting catalysts to their starting temperature or usage temperature. This takes place in that the combustible air/fuel mixture is ignited again at an appropriate point in the direct proximity of the catalyst.

The ignition devices known for the ignition of such a combustible gas mixture, for example, spark plugs or glow plugs, are unsuitable for this task or can only be used to a limited extent because, under the existing environmental conditions, such as low pressure, low temperature and a high fraction of natural gases, a reliable ignition and complete combustion cannot be ensured.

It is therefore an object of the present invention to provide an arrangement for igniting a combustible gas mixture for the exhaust system of an internal-combustion engine which can reliably carry out the ignition and offers a high probability of a complete combustion.

The arrangement and corresponding exhaust system according to preferred embodiments of the invention have the advantage that a reliable ignition is ensured and the warm-up time of the catalyst and the exhaust gas emissions can be drastically reduced. The required power is low because only the heating wire and not the entire carrier material must be heated. According to preferred embodiments of the invention, there is provided an arrangement for igniting a combustible gas mixture for the exhaust system of an internal-combustion engine, comprising a frame device which is wound with a heating wire and can be installed in an exhaust gas train of an exhaust system transversely to a flow axis of exhaust gas in the exhaust system, and a power supply device for supplying the heating wire with electric current for generating a predetermined heating wire temperature, wherein the frame device defines a flow range in which a heating wire grid is provided.

According to certain preferred embodiments of the invention, there is provided an exhaust system comprising an ignition arrangement of the type described herein installed transversely to a flow axis of exhaust gas flowing in the system, a first catalyst device arranged downstream of the ignition arrangement, and a housing which has a widening for receiving a frame device of the ignition arrangement.

An idea on which the present invention is based includes arranging a grid-shaped structure of heating wire or resistance wire as the ignition arrangement transversely to the main flow axis in the exhaust gas train and of electrically heating it to a temperature which is suitable for igniting the oncoming combustible gas mixture. Expediently, the material thickness of the conductive heating wire should be selected to be as small as is possible with respect to the strength in order to minimize the heating thermal capacity and thus the required electric current intensity.

Advantageous further developments and improvements of the invention are described herein and in the claims.

According to a preferred further development of certain preferred embodiments of the invention, the frame device comprises a first frame and a second frame which is arranged essentially parallel thereto in a spaced manner, which frames are alternately wound with the heating wire. This results in a stable heating wire grid.

According to another preferred further development of certain preferred embodiments of the invention, the first frame can be acted upon by the power supply device by a first electric potential (plus pole), and the second frame can be acted upon by a second electric potential (ground potential). This embodiment with two frames electrically provides a parallel connection of many individual heating wire elements and has the advantage of a minimized electric resistance. Furthermore, the tearing-off of a heating wire segment at any point does not cause a failure of the entire ignition arrangement.

According to another preferred further development of certain preferred embodiments of the invention, the first and the second frame are separated from one another by a preferably elastic insulation device. This provides the required electric uncoupling and a mechanical prestressing against the thermal expansion.

According to another preferred further development of certain preferred embodiments of the invention, the heating wire is threaded by way of hook ends provided on the frame device.

According to another preferred further development of certain preferred embodiments of the invention, the heating wire is prestressed by way of an elastic prestressing device for compensating the thermal expansion.

According to another preferred further development of certain preferred embodiments of the invention, the heating wire is catalytically coated. This reduces the heating temperature and promotes the catalyst effect.

Exhaust systems according to preferred embodiments of the invention have an ignition arrangement installed transversely to the flow axis of the exhaust gas has a first catalyst device arranged downstream of the ignition arrangement and a housing which preferably has a widening for accommodating the frame device.

According to another preferred further development of certain preferred embodiments of the invention, the ignition arrangement is arranged such that the flow area corresponds essentially to the cross-section of the catalyst device. This results in a whole-surface heating of the catalyst device.

According to another preferred further development of certain preferred embodiments of the invention, the ignition arrangement is arranged such that a flame front of the ignited gas mixture can form before the catalyst device is reached. This results in a maximal efficiency of the preheating.

According to another preferred further development of certain preferred embodiments of the invention, the frame device is connected with the housing on its circumference. This prevents a flow around the ignition arrangement.

According to another preferred further development of certain preferred embodiments of the invention, a second catalyst device is arranged upstream of the ignition arrangement. It is particularly effective to place the ignition arrangement in the housing of the main catalyst in the free space between a first and a second monolith.

Other objects, advantages and novel features of the present invention will become apparent from the following detailed description of the invention when considered in conjunction with the accompanying drawings.

DETAILED DESCRIPTION OF THE DRAWINGS

Figure 1A:
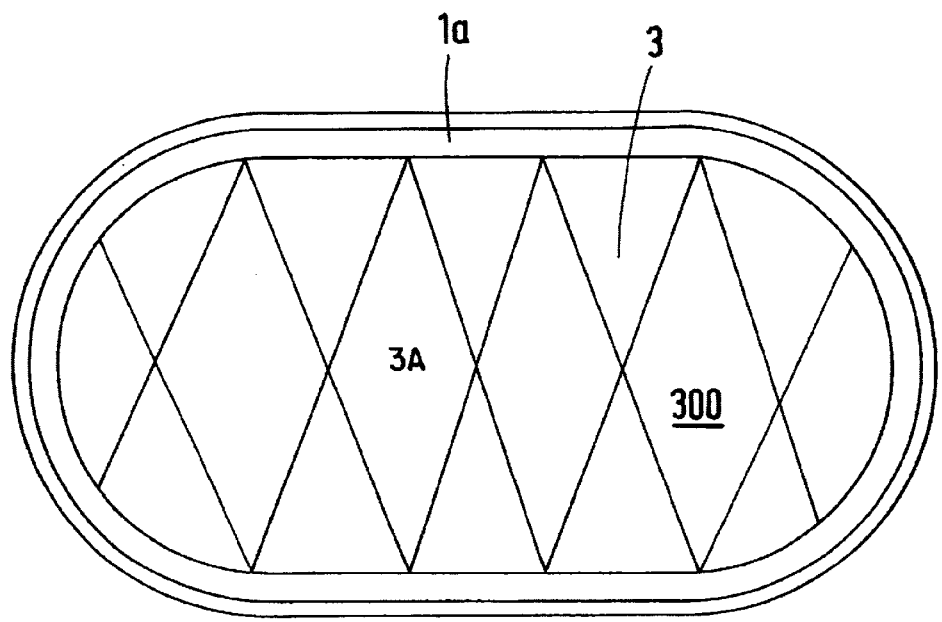
FIG. 1a is a schematic view in flow direction A of FIG. 1b, depicting an ignition arrangement for an engine exhaust system constructed according to a preferred embodiment of the present invention.

In the drawing figures, the same reference numbers indicate identical elements or elements having the same function.

Figure 1B:
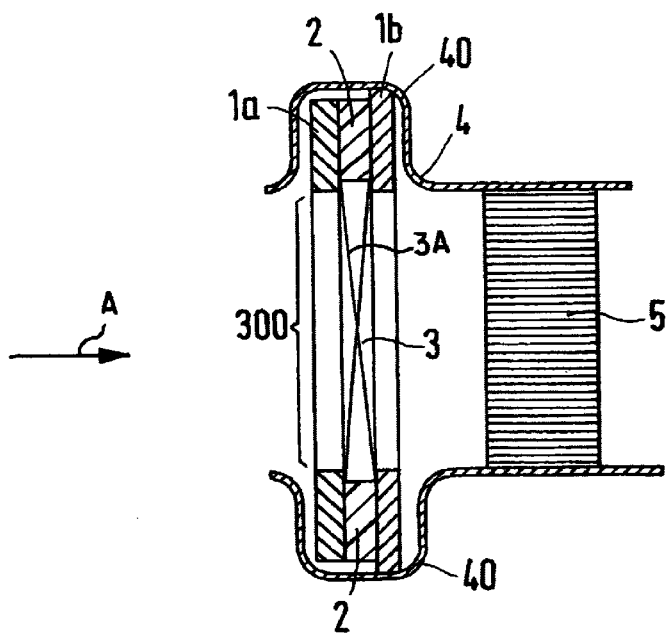
FIG. 1b is a schematic sectional view of a part of an engine exhaust system constructed according to a preferred embodiment of the present invention.

FIGS. 1a and 1b are schematic representations of an arrangement according to a preferred embodiment of the present invention.

Figure 2:
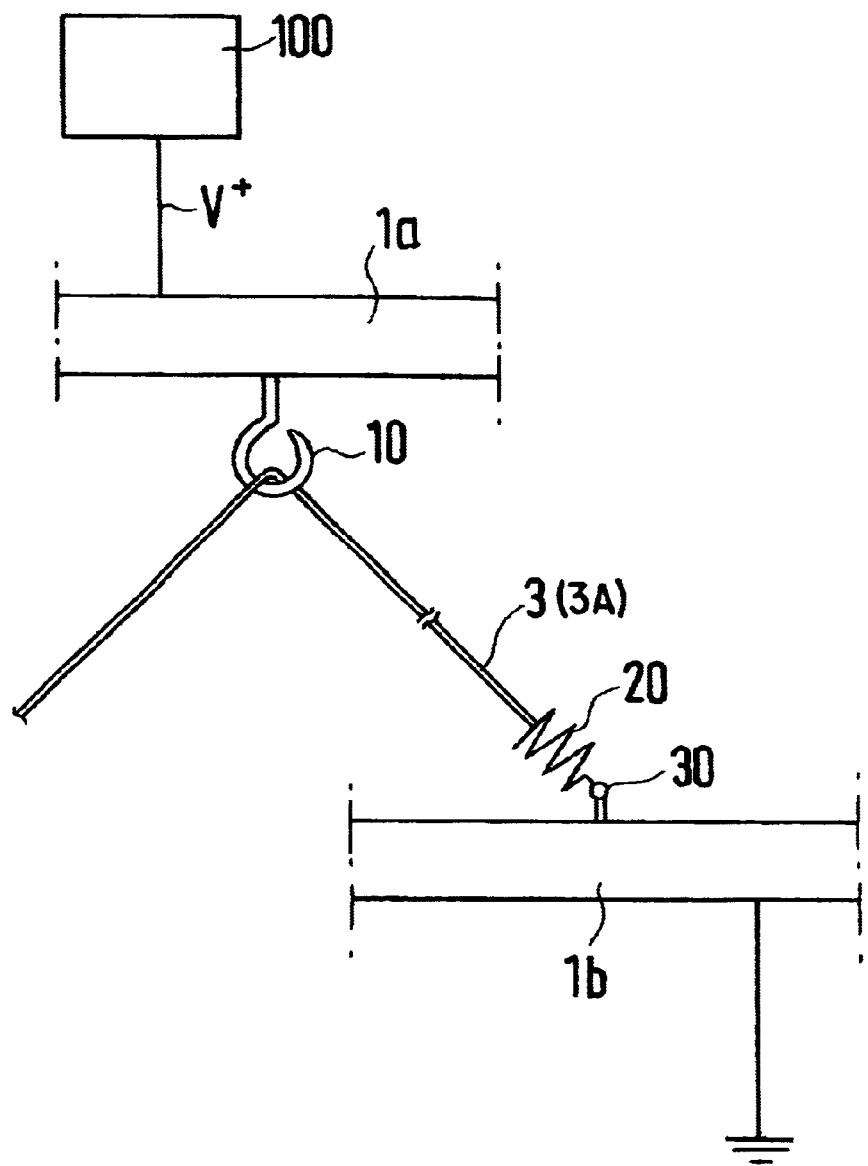
FIG. 2 is an enlarged cutout showing the heating wire anchoring of the arrangement according to FIG. 1.

In FIGS. 1a and 1b and 2, reference numbers 1a and 1b indicate a first and a second frame made of metal in a monolith shape, which, separated by an insulation device 2, are placed upon one another and are virtually endlessly wound alternately with heating wire 3 (in a "racetrack shape"). Wire section 3A is representative of the wire sections of the wire grid, electrically contacting at the top in FIGS. 1a and 1b with the frame 1a and contacting at the bottom in FIGS. 1a and 1b with the frame 1b. The winding forms a flow area 300 through which exhaust gas can flow and which has a heating wire grid, whose mesh width can be determined virtually freely according to the requirements.

Furthermore, reference number 4 indicates a housing of a catalyst 5 which, at a suitable point in front of the catalyst 5, has a widening for accommodating the two frames 1a, 1b. In the case of this arrangement, the flow region 300 essentially corresponds to the cross-section of the catalyst 5. The first frame 1a can be connected by a power supply device 100 (compare FIG. 2), which is not shown, with a first electric potential V+ whereas the second frame 1b is connected on its circumference with the housing 4 preferably by welding and is therefore applied to the ground potential wherein said heating wire grid is supported in a frame device having a first metal frame and a second metal frame arranged parallel to one another and separated by an insulating device, said first metal frame being spaced from the housing and said second metal frame being fixed to the housing.

An ignition arrangement in the form of a heating wire grid is arranged such that a flame front of the ignited gas mixture can form before the catalyst device 5 is reached. This results in a maximal efficiency of the preheating and in a rapid reaching of the light-off temperature.

FIG. 2 is an enlarged cutout of the heating wire anchoring of the arrangement according to FIG. 1.

As illustrated in FIG. 2, small hook-shaped hook ends 10 are provided on the first and the second frame 1a, 1b, by way of which hook ends 10 the heating wire 3 is wound. At the end of the heating wire 2, an elastic prestressing device 20, such as a simple spring, is provided which is connected with an anchoring 30 provided on a second frame 1b. Corresponding hooks are provided at the frames 1a and 1b for guiding each turn of the heating wire 3 wound thereon.

This elastic prestressing device 20 compensates the length in the case of a thermal expansion of the heating wire 3.

By way of the power supply device 300, the heating wire 23 is supplied with such a current that it reaches a surface temperature of typically several 100° C. (hundreds of degrees centigrade) in order to ignite the flowing-through gas mixture. The grid braiding is to be selected such that the ignition temperature can be maintained at an air mass flow rate of typically 20 kg/h.

In the present embodiment, the heating wire itself is coated, for example, with platinum, which produces a catalytic effect and reduces the ignition temperature.

Although the present invention was described above by means of a preferred embodiment, it is not limited thereto and can be modified in multiple manners.

Although the above-mentioned embodiment was explained by using a certain two-part frame, it is not limited thereto, and any suitable frame device can be used for mounting the heating wire grid braiding. The geometry of the grid braiding can be arbitrarily adapted to the concrete requirements.

Several such frames can also be arranged behind one another in the exhaust gas train, should the ignition effect of an individual ignition arrangement of this type not be sufficient.

Finally, the ignition arrangement according to the invention can not only be used for exhaust gas trains of vehicle internal-combustion engines but for arbitrary exhaust gas devices containing an ignitable mixture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Arrangement for igniting a combustible gas mixture for the exhaust system of an internal-combustion engine, comprising:

a frame device which is wound with a heating wire and can be installed in an exhaust gas train of an exhaust system transversely to a flow axis of exhaust gas in the exhaust system, said exhaust gas train having a housing, and a power supply device for supplying the heating wire with electric current for generating a predetermined heating wire temperature, wherein the frame device defines a flow range in which a heating wire grid is provided, said heating wire grid being supported in the frame device having a first metal frame and a second metal frame arranged parallel to one another and separated by an insulating device, said first metal range being spaced from the housing and said second metal frame being fixed to the housing.

2. Arrangement according to claim 1, wherein the frames are alternately wound with the heating wire.

3. Arrangement according to claim 2,
wherein the first frame can he acted upon by way of the power supply device by a first electric potential and the second frame can be acted upon by a second electric potential.

4. Arrangement according to claim 1,
wherein the heating wire is threaded by way of hook ends provided on the frame device.

5. Arrangement according to claim 2,
wherein the heating wire is threaded by way of hook ends provided on the frame device.

6. Arrangement according to claim 3,
wherein the heating wire is threaded by way of hook ends provided on the frame device.

7. Arrangement according to claim 1,
wherein the heating wire is prestressed by way of an elastic prestressing device for compensating the heat expansion.

8. Arrangement according to claim 2,
wherein the heating wire is prestressed by way of an elastic prestressing device for compensating the heat expansion.

9. Arrangement according to claim 3,
wherein the heating wire is prestressed by way of an elastic prestressing device for compensating the heat expansion.

10. Arrangement according to claim 4,
wherein the heating wire is prestressed by way of an elastic prestressing device for compensating the heat expansion.

11. Arrangement according to claim 1,
wherein the heating wire is catalytically coated.

12. Arrangement according to claim 2,
wherein the heating wire is catalytically coated.

13. Arrangement according to claim 3,
wherein the heating wire is catalytically coated.

14. Arrangement according to claim 4,
wherein the heating wire is catalytically coated.

15. Arrangement according to claim 7,
wherein the heating wire is catalytically coated.

16. Exhaust system comprising:
an ignition arrangement installed transversely to a flow axis of exhaust gas flowing in the system,
a first catalyst device arranged downstream of the ignition arrangement, and
a housing which has a widening for receiving a frame device of the ignition arrangement,
wherein the ignition arrangement includes:
  heating wire wound on the frame device, and
  a power supply device for supplying the heating wire with electric current for generating a predetermined heating wire temperature,
  wherein the frame device defines a flow range in which a heating wire grid is provided, and
  wherein said heating wire grid is supported in the frame device having a first metal frame and a second metal frame arranged parallel to one another and separated by an insulating device, said first metal frame being spaced from the housing and said second metal frame being fixed to the housing.

17. Exhaust system according to claim 16,
wherein the ignition arrangement is arranged such that the flow range corresponds essentially to a cross-section of the catalyst device.

18. Exhaust system according to claim 16,
wherein the ignition arrangement is arranged such that a flame front of the ignited gas mixture can form before the catalyst device is reached.

19. Exhaust system according to one of claim 16,
wherein a second catalyst device is arranged upstream of the ignition device.

20. Exhaust system according to one of claim 17,
wherein a second catalyst device is arranged upstream of the ignition device.

21. Exhaust system according to one of claim 18,
wherein a second catalyst device is arranged upstream of the ignition device.

22. An exhaust system comprising:
a housing defining an exhaust gas flow path and supporting a catalyst,
a heating wire grid supported at the housing and extending over the entire exhaust gas flow path upstream of the catalyst, and
an electrical power supply for said heating wire grid,
wherein said heating wire rid is supported in a frame device having a first metal frame and a second metal frame arranged parallel to one another and separated by an insulating device, said first metal frame being spaced from the housing and said second metal frame being fixed to the housing.

23. A method of igniting a combustible gas mixture in a combustion engine exhaust system which includes:
a housing defining an exhaust gas flow path and supporting a catalyst,
a heating wire grid supported at the housing and extending over the entire exhaust gas flow path upstream of the catalyst, and
an electrical power supply for said heating wire grid,
said method comprising providing electrical current to said wire grid while flowing exhaust gases therethrough;
wherein said heating wire grip is supported in a frame device having a first metal frame and metal frame arranged parallel to one another and separated by an insulating device, said metal frame being spaced from the housing and said second metal frame being fixed to the housing.

* * * * *